Patented Dec. 21, 1937

2,103,219

UNITED STATES PATENT OFFICE 2,103,219

CONTROLLED CATALYTIC OXIDATION

Leslie G. Jenness, Brooklyn, N. Y.

No Drawing. Application January 30, 1935,
Serial No. 4,095

6 Claims. (Cl. 23—2)

The present invention relates to the oxidation of oxidizable gases. More particularly, it relates to a catalytic process of oxidation of such gases and a method of controlling the catalyst. The process of the invention has particular application to the oxidation of such harmful oxidizable gases as may be combined with or contained in useful or desirable gases. One such instance of great importance commercially occurs in the production of hydrogen on a commercial scale.

In practically all of the processes for producing hydrogen commercially, the product is contaminated with carbon monoxide to a highly objectionable degree. Indeed, for many purposes for which hydrogen is utilized, it must be pure or substantially so. It must, particularly, be practically free from carbon monoxide. The elimination of carbon monoxide is especially important in the process of hydrogenating oils and also in producing compounds of nitrogen and hydrogen. In these and other processes, the elimination of carbon monoxide from gases is extremely important commercially.

In cases where hydrogen is mixed with even a comparatively small percentage of carbon monoxide, it has been difficult and expensive, by any of the present processes, to eliminate it and thus to produce a satisfactorily pure hydrogen. The problem, long understood by the chemist, is to effect an oxidation of the carbon monoxide without oxidizing the hydrogen. If the carbon monoxide could be completely oxidized to carbon dioxide, it would be a comparatively simple matter to get rid of it by well known scrubbing processes. If, however, in effecting such oxidation, the hydrogen also is oxidized in considerable quantities, water will be thereby formed. There is a strong probability, therefore, that the process will be inefficient by reason of the large quantity of hydrogen lost in the formation of water, and not commercial because of the small yield of pure hydrogen.

This problem of eliminating carbon monoxide has been aptly expressed by the statement that if the reaction

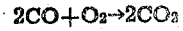

can be obtained without the reaction

substantially pure hydrogen may be obtained. Practical methods of solving this problem have, however, been difficult of attainment. While these methods have involved a recognition of the principle that the temperatures at which carbon monoxide oxidation is to be carried out must be kept relatively low, and the increase of the activity of the particular catalyst used has a marked effect in increasing these temperatures, the regulation of catalytic activity has not been understood. Nor has it been understood how the temperature of reaction may be controlled. Thus, although it has been recognized that (1) heat is liberated in the reaction $2CO+O_2 \rightarrow 2CO_2$ as well as in the reaction $2H_2+O_2 \rightarrow 2H_2O$, (2) that the rate of these reactions is increased by increased temperature, and (3) that the increase in the rate of hydrogen oxidation is faster than that of carbon monoxide oxidation as the temperature increases,—it has not been known how to control these factors by the production and in the use of catalysts that have a degree of activity enabling the desired reaction to be carried out without the generation of so much heat as to cause a substantial quantity of hydrogen to be oxidized and a concomitant deterioration of the catalyst.

It is the characteristic, also, of prior art processes designed for the purpose of oxidizing the carbon monoxide impurity of hydrogen, that the catalysts become spent beyond the possibility of reactivation and must be thrown away and wasted, and a new charge of catalyst is required for the removal of any further quantities of carbon monoxide. This interrupts the process, leads to increased costs, and involves many disadvantages.

I have found that it is possible to regulate the temperature at which carbon monoxide may be oxidized from intermixture with hydrogen so as to enable this reaction to be carried out without substantial oxidation of the latter. I have found it possible to do this by controlling the activity of the catalyst or oxidizing agent used for the reaction by ensuring the presence of oxygen therein within a definite range of proportions to the total quantity of catalyst. In this way, a more or less constant supply of available oxygen for carrying out the desired reaction is maintained. There is thus secured a more even distribution of heat generated on the surface of the catalyst and a more constant temperature of operation than would occur if such specially adjusted catalyst were not used. I have also found that I can carry out the desired reaction by a process in which the catalyst, when partially exhausted, may be reactivated for further use, and I may reactivate either continuously or in an intermittent manner without interrupting the desired oxidizing process.

When oxidizing carbon monoxide from hydrogen in a continuous manner, the catalysts of the present invention seem to serve as an intermediary between the oxygen or air, which is supplied to the stream of the gas mixture to be treated, and the carbon monoxide component of the mixture, the catalysts thus receiving their oxygen from the oxygen or air supply and transferring it to the carbon monoxide. By supplying a proper proportion of oxygen or air I am able to use these catalysts indefinitely and thus provide a continuous and efficient process of carbon monoxide oxidation. The process in which the catalyst is reactivated intermittently is described and claimed in my copending application Serial No. 9,264 filed March 4, 1935.

In carrying out the process of the present invention to operate continuously in the oxidization of carbon monoxide from intermixture with hydrogen, a gas mixture containing hydrogen and carbon monoxide, together with free oxygen such as pure oxygen or air, is passed over a manganese oxide catalyst at a temperature regulated somewhat below that at which substantial hydrogen oxidization takes place, which I have determined to be in the neighborhood of 175° C. The manganese oxide catalyst that permits such regulation of temperature is preferably a modified form of that described and claimed in my United States Patent No. 1,937,488 dated November 28, 1933. The precise manner of modification of such a catalyst will be seen from the following detailed description of the invention.

A foraminate manganese dioxide may be made according to the aforesaid patent by converting a manganese dioxide to manganese sesquioxide, by subjecting it to the action of reducing gases, then dissolving the divalent manganese with a suitable acid, and then filtering, washing, pressing, breaking up and drying the resultant foraminate product. If such a catalyst is prepared by carrying out the drying step at 200° C., a product analyzing $MnO_2$ is obtained. Such a catalyst, if used to oxidize carbon monoxide from hydrogen, will cause the heat of reaction to rise almost immediately to a point where the particles of the catalyst incandesce, where a large amount of hydrogen is oxidized to water and where the catalyst is reduced to an extent that it is substantially spent. This spent catalyst can be revivified or reactivated to function again to oxidize CO only with difficulty.

If, however, the above mentioned catalyst dried at 200° C. is treated with a gas containing small quantities of CO, and subsequently treated with an oxygen-containing gas prior to use in the desired carbon monoxide oxidation reaction, the initial sudden increase in temperature is avoided. In the use of such a modified catalyst, oxygen to the extent of about 30% in excess of that theoretically required to accomplish the desired CO oxidation may be supplied to the reaction, and under such conditions the catalyst will function indefinitely and continuously. Moreover, an uncontrolled increase of temperature to a point where the hydrogen is oxidized to any substantial degree is obviated.

The exact excess quantity of oxygen required for carrying out the desired reaction will, of course, vary in accordance with other factors such as the concentration of the carbon monoxide, and the ratio of the velocity of the gas flow to the volume of the chamber or converter in which the reaction takes place. For the examples given I have found that 30 to 100% excess oxygen is sufficient to bring about an efficient oxidation of the carbon monoxide when the referred to manganese oxide catalyst is used.

The process may thus be continuously operated, and the catalyst maintained in a more or less uniform degree of activity over a long period of time, during which no undue rise in temperature takes place and a high efficiency is maintained.

From the above it is apparent that the desirable catalyst is one which is a reduced form of $MnO_2$—one in which the amount of oxygen available for oxidizing purposes is somewhat below that contained in $MnO_2$. By careful experimentation and analysis I have found that the desirable catalyst is one which in chemical composition lies somewhere between $MnO_2$ and $Mn_3O_4$. As indicated hereinabove, however, the catalyst seems to be constantly acquiring oxygen from the independent supply thereof used during the reaction, and acts as an intermediary to transfer such oxygen to the carbon monoxide. This transfer continues throughout the period of exposure to the reacting gases and, therefore, the composition of the catalyst is constantly changing. The catalyst, therefore, may be more accurately described as one which is fluctuating in composition, whose composition varies between $MnO_2$ and $Mn_3O_4$, probably constituting mixtures of manganese oxides in varying degrees of oxidation. The catalyst, however, never actually reaches the upper limit ($MnO_2$) as this is much too active for the purposes in mind. It might be and probably is true that analysis would show some $MnO_2$ in the particles of my catalyst at any given time during its operation, but such $MnO_2$ is undoubtedly contained within the particle where its action is either very limited or non-existent.

While I have indicated a somewhat broad range within which lies the preferable form, or mixtures of forms, of the catalyst used in the present invention, I can with reasonable certainty define that range more specifically, as I have found that its available oxygen, when operating at 100% efficiency, is about 10%, compared with 14 to 14.5% for the original $MnO_2$ prepared from pyrolusite ore. This corresponds to a mixture of $Mn_2O_3$ and $MnO_2$, probably in the form of particles of $MnO_2$, the surface of which is reduced to the form of a lower oxide.

By available oxygen I refer to the standard meaning of the term, the percentages being commonly determined by ascertaining that portion of the total compound or mixture which is available for and capable of oxidizing an acidic solution of ferrous sulphate or oxalic acid.

I have found, however, that a catalyst having as little as 8% available oxygen will alone operate efficiently for a considerable time to oxidize carbon monoxide from hydrogen. Such a catalyst undoubtedly represents a manganese compound consisting predominantly of $Mn_2O_3$ and the desirable range of fluctuation of the catalyst during the desired oxidizing reaction is undoubtedly between $Mn_2O_3$ and $Mn_3O_4$, the catalyst never, however, approaching sufficiently close to the lower oxide that it cannot be reoxidized by the free oxygen to $Mn_2O_3$.

Expressed otherwise, the desirable catalyst for efficient carbon monoxide oxidation in the manufacture of hydrogen is one which lies between a manganese compound having one-half an available oxygen atom per atom of manganese ($Mn_2O_3$) and one having one-third an available oxygen atom per atom of manganese ($Mn_3O_4$). Due to the fact, however, that some $MnO_2$ may be present in the interior of a particle of such a catalyst, the desirable catalyst may contain by analysis between one-third of an atom and one atom of available oxygen per atom of manganese.

Another way in which I may modify a manganese dioxide catalyst and form it into a lower oxide which is thus rendered selectively active for carbon monoxide oxidation, is by regulating the heat of drying, and therefore the degree of hydration, of the foraminate catalyst. Thus, if the catalyst, after leaching, filtering, washing, pressing and breaking up the foraminate product, is dried at somewhat lower temperatures than those indicated as preferable in my Patent No. 1,937,488, for instance at 110 to 115° C., the same operates efficiently to oxidize CO from H without an undue rise in the temperature of the catalytic bed. In fact, it is sometimes necessary during the process to supply heat to the reaction to maintain it above 100° C.

After drying, the desired oxidation is carried out for several hours and the catalyst becomes reduced to the state previously described. As will hereinafter be explained, the purpose of drying at a lower temperature is to prevent the manganous acid formed during the leaching treatment from being fully dehydrated and thus form a partially hydrated $MnO_2$ which when used to oxidize carbon monoxide will perform the oxidation at a reduced rate and will facilitate the attainment of the desired stage of oxidation without due increase in temperature. The same ultimate result is achieved, i. e., the production of a manganese oxide catalyst in an intermediate stage of oxidation.

The following specific examples of my process are given for purposes of illustration:

Example 1

A charge of manganese dioxide made according to my Patent No. 1,937,488 is pressed and broken up into particles ranging in size from ¼" to ½" in diameter and dried at 85 to 90° C. in an air circulating oven for a period of sixteen hours, after which the material is dried at 200° C. until there is no further loss in weight. A gas mixture containing a small quantity of CO, about 1%, and the balance composed of 99% carbon dioxide, is passed over the catalyst. This gas mixture may be varied by using a mixture of 1 to 5% carbon monoxide and the balance composed of one or more inert gases, such as nitrogen or carbon dioxide. This may be conveniently accomplished in a converter provided with temperature control means. Into a converter of this nature, 4" in diameter and 29" in height, having a volume of about 364 cubic inches, 11.4 pounds of catalyst is charged and the gas mixture passed through it at a rate of about 10 liters per minute for a period of four hours, the temperature being maintained at 125-135° C. Air may then be passed through the converter at the rate of 10 liters per minute for a period of four hours. This constitutes the preliminary reduction and reoxidizing treatment and the hydrogen gas containing carbon monoxide and an excess of oxygen may then be passed through the converter at a rate of about 10 liters per minute. This effects 100% removal of the carbon monoxide without creating sufficient heat to cause a temperature rise and accordingly without causing the catalyst to deteriorate. A gas mixture having an approximate composition as follows may be efficiently treated with a catalyst prepared as above outlined:

| | Percent |
|---|---|
| Carbon monoxide | 1 |
| Oxygen | 1 |
| Hydrogen | 74 |
| Carbon dioxide | 24 |

The presence of carbon dioxide is, of course, not necessary in the practice of carbon monoxide oxidation with the catalysts of the present invention, as the same is inert as far as concerns the reactions dealt with. There are many cases where, due to the preparation of hydrogen from water gas and similar products, the presence of considerable quantities of carbon dioxide is unavoidable, and the treatment of such a gas has been given merely for illustrative purposes. The oxidizing reaction proceeds in precisely the same way in the absence of carbon dioxide.

If desired, preliminary reduction and oxidation may be carried out by the use of a single inert gas containing small quantities of carbon monoxide and oxygen.

Example 2

The pressed and sized catalyst prepared as described in my Patent No. 1,937,488 is dried at 85° to 90° C. in an air circulating oven for about sixteen hours and then charged into a converter similar to that described in Example 1. The temperature is increased to 110-115° C. where it is maintained for a period of about five hours while a slow stream of air is passed through for the purpose of carrying off moisture liberated under these conditions. The catalyst is then ready for use in oxidizing carbon monoxide from hydrogen which is carried out as described in Example 1. A gas mixture of composition like that in Example 1 may be effectively treated with 100% removal of carbon monoxide, and the catalyst may be used indefinitely.

Example 3

In this example the catalyst dried at 200° C. is utilized directly in the treatment of the carbon monoxide-containing gas but with the realization that 100% efficiency is not obtained until the catalyst has been reduced to an oxide or mixture of oxides within the desired range. The initial operation of the process operated in this way must, therefore, be considered as a preliminary equalizing treatment during which the desired catalyst is formed, and must not, therefore, be considered part of the treatment wherein carbon monoxide is removed with 100% efficiency.

The pressed and dried catalyst is dried at 85° to 90° C. in an air circulating oven for about sixteen hours and then dried at 200° C. The catalyst is charged into a converter such as that previously described and a hydrogen-carbon monoxide mixture of the composition of that described in Example 1 is passed through it slowly at the rate of 1 to 2 liters per minute. The flow of such gas must be carefully regulated so that the gas is not admitted in such quantities that the temperature in the converter will rise too high, say in the neighborhood of 150° C. A period of about five hours is required before the tendency of the catalyst to generate excessive heat is terminated, and before the process can be permitted to take place at the full flow of 10 liters per minute. After this initial treatment, however, the carbon monoxide will be oxidized with 100% efficiency with substantially no hydrogen oxidation and the development of no excessive quantities of heat. In fact, it is necessary actually to supply some heat to the converter to maintain the temperature at 110° to 115° C.

In the above examples, it is, of course, understood that specific figures as to the size of the converter and amount of catalyst have been given for the purpose of illustration merely, and increase in the size of the equipment used will necessitate an increased amount of gas to take care of the larger quantity of catalyst. For a given amount of gas to be handled, the proper balance between the quantity of gas and the amount of catalyst used will be readily perceived by those skilled in the art upon an understanding of the principles herein laid down.

As has hereinabove been indicated, the regulated drying of a foraminate manganese dioxide catalyst enables the subsequent oxidizing of carbon monoxide from hydrogen to be carried out without undue increase in temperatures, and allows the formation of the catalyst into the desired intermediate stage of oxidation. The theory underlying this treatment is, briefly, that the degree of hydration of the catalyst governs its activity as an oxidizer. For instance, a catalyst made as hereinabove described according to the said patent is, before drying, in a hydrated condition and is in the form of manganous acid $H_2MnO_3$. When it is completely dried, it is, of course, fully dehydrated. It is most active when fully dehydrated. When hydrated, the product is associated with hydroxyl radicals instead of oxygen atoms and varying degrees of dehydration will drive off these radicals and increase the proportion of oxygen atoms to a greater or less extent. By regulating the degree of hydration of the catalyst, therefore, it is possible to regulate the proportion of these oxygen atoms to the total composition, and thus to prevent the accumulation of heat on a restricted surface of the catalyst, during the desired carbon monoxide oxidation. It is thus possible to cause the heat of reaction to be evenly distributed throughout the catalytic bed and thus to prevent the temperature from rising to a point where substantial quantities of hydrogen are oxidized. Accordingly, the partially hydrated catalyst obtained by drying at reduced temperatures prevents the initial rise in temperature (that would occur if $MnO_2$ were used) for a period sufficient to allow formation of the desired lower oxides by the reducing action of the carbon monoxide gas. During this time the remaining OH radicals are driven off while the O atoms are taken up. Ultimately, the catalyst is formed into the desired intermediate stage of oxidation, but this has been accomplished, due to the retarding effect of the OH molecules, without the generation of excess heat and without, therefore, the oxidation of the hydrogen.

The preferable temperatures at which a catalyst prepared as above described is dried are from in the neighborhood of 110° to 115° C. Temperatures above this range liberate too many hydroxyl radicals and cause the catalyst to be so active that, during the passages of the gases over it, there occurs a rapid rise in the temperature of the upper portion of the catalytic bed, with the oxidation of considerable quantities of hydrogen along with the carbon monoxide. Temperatures of drying below this range are insufficient to liberate sufficient hydroxyl radicals and a catalyst thus produced is so inactive that it is actually necessary to supply heat to the reaction during the process in which the catalyst is used, in which, of course, no appreciable quantities of hydrogen are oxidized.

When the catalyst is dried at 200° C., the same is usually completely dehydrated and, as in Examples 1 and 3, must be differently treated, but the ultimate catalyst is the same in that it comprises lower oxide forms.

While the invention has been described with particular reference to the utilization of the catalysts described and claimed in my prior Patent No. 1,937,488, it should be understood that the invention is not limited in its application to such catalysts. The catalysts of the present invention comprising manganese oxides of the described intermediate stage of oxidation, may be obtained directly from manganese ore or otherwise, and although these catalysts are not so desirable as those developed from the foraminate catalysts, their use for some purposes may be desirable.

While, also, I have made particular reference to the fact that a certain proportion of oxygen is supplied to the oxidizing reaction when continuously carried out, it should be understood that I may use air or other inert oxygen-bearing gas or gas mixture, provided the particular problem at hand requires only the removal of carbon monoxide and is not affected by the presence of nitrogen or other inert gases in the resulting hydrogen product. With air it is generally necessary to increase the temperature at which the reaction progresses, for the reason that the inert constituents in air tend to dilute the mixture and to retard the reaction.

Having thus described my invention, what I claim is:

1. A mixture of manganese oxides capable of substantially completely oxidizing carbon monoxide in the presence of hydrogen and oxygen without substantial oxidation of said hydrogen, said mixture being prepared by dissolving MnO from a manganese oxide consisting essentially of $Mn_2O_3$, and reducing the remaining $MnO_2$ at a temperature below approximately 150° C. to produce a mixture of manganese oxides having less than one and more than one third atom of available oxygen per atom of manganese.

2. A mixture of manganese oxides capable of substantially completely oxidizing carbon monoxide in the presence of hydrogen and oxygen without substantial oxidation of said hydrogen, said mixture being prepared by dissolving MnO from a manganese oxide consisting essentially of $Mn_2O_3$, and drying the remaining substance at a temperature not greater than approximately 115° C. to produce a mixture of manganese compounds containing less than one and more than one third atom of available oxygen per atom of manganese.

3. A mixture of manganese oxides capable of substantially completely oxidizing carbon monoxide in the presence of hydrogen and oxygen without substantial oxidation of said hydrogen, said mixture being prepared by dissolving MnO from a manganese oxide consisting essentially of $Mn_2O_3$, substantially completely dehydrating the remaining substance, subjecting the dehydrated substance to reducing gases to produce a mixture of manganese oxides having less than one and more than one third atom of available oxygen per atom of manganese, and maintaining the temperature of the oxides during contact with said reducing gases below approximately 150° C.

4. The method of making a mixture of manganese oxides capable of substantially completely oxidizing carbon monoxide to carbon dioxide in the presence of hydrogen and oxygen, which comprises removing MnO from particles of a manganese oxide consisting essentially of $Mn_2O_3$ without shattering said particles, and reducing the remaining oxide at a temperature below 150° C. to produce a mixture of manganese oxides having less than one and more than one third atom of available oxygen per atom of manganese.

5. The method of substantially completely removing carbon monoxide from admixture with hydrogen which comprises contacting a mixture of carbon monoxide and hydrogen in the presence of oxygen with an oxidizing material capable of oxidizing said carbon monoxide without substantial oxidation of hydrogen, said material being prepared by removing MnO from particles of $Mn_2O_3$ without shattering the particles, and prior to said contacting reducing the remaining $MnO_2$ at a temperature below approximately 150° C. to a mixture of manganese oxides having less than one and more than one third atom of available oxygen per atom of manganese.

6. The method of substantially completely removing carbon monoxide from admixture with hydrogen which comprises contacting a mixture of carbon monoxide and hydrogen in the presence of oxygen with an oxidizing material capable of oxidizing said carbon monoxide without substantial oxidation of hydrogen, said oxidizing material being prepared by dissolving MnO from $Mn_2O_3$ to produce a hydrated $MnO_2$, and prior to said contacting treating said hydrated $MnO_2$ including reducing said $MnO_2$ at a temperature below approximately 150° C. to produce a mixture of manganese oxides having more than one third and less than one atom of available oxygen.

LESLIE G. JENNESS.